United States Patent [19]
Xu et al.

[11] Patent Number: 5,796,889
[45] Date of Patent: Aug. 18, 1998

[54] INTEGRATED WDM COUPLER DEVICES FOR FIBEROPTIC NETWORKS

[75] Inventors: Jingyu Xu, San Jose; Jing-Jong Pan, Milpitas, both of Calif.

[73] Assignee: E-Tek Dynamics, Inc., San Jose, Calif.

[21] Appl. No.: 614,864

[22] Filed: Mar. 13, 1996

[51] Int. Cl.⁶ ......................................... G02B 6/28
[52] U.S. Cl. ................... 385/24; 385/31; 385/34; 385/11; 385/33; 372/703; 359/124; 359/131
[58] Field of Search ..................... 385/24, 31, 34, 385/11, 39, 15, 33; 372/703, 6; 359/156, 173, 180, 181, 188, 489, 490, 502, 514, 124, 131

[56] References Cited

U.S. PATENT DOCUMENTS

| | | | |
|---|---|---|---|
| 4,296,995 | 10/1981 | Bickel | 350/96.15 |
| 4,474,424 | 10/1984 | Wagner | 350/96.16 |
| 4,736,359 | 4/1988 | Cohen et al. | 370/3 |
| 4,880,289 | 11/1989 | Imoto et al. | 350/96.18 |
| 4,932,742 | 6/1990 | Tohme | 350/96.18 |
| 5,050,954 | 9/1991 | Gardner et al. | 385/16 |
| 5,076,672 | 12/1991 | Tsuda et al. | 359/244 |
| 5,475,489 | 12/1995 | Gottsche | 356/364 |
| 5,555,330 | 9/1996 | Pan et al. | 385/11 |
| 5,642,447 | 6/1997 | Pan et al. | 385/24 X |
| 5,642,448 | 6/1997 | Pan et al. | 385/31 |

FOREIGN PATENT DOCUMENTS 60-66213   4/1985   Japan.

*Primary Examiner*—Phan T. H. Palmer
*Attorney, Agent, or Firm*—Townsend and Townsend and Crew LLP

[57] ABSTRACT

A compact, high-performance WDM coupler which couples at least three optical fibers is presented. The coupler has the ends of first, second and third optical fibers near a first face of a collimating lens. A wavelength-dependent filter, such as a long-pass filter, a short-pass filter or a band-pass filter, is located near the opposite face of the collimating lens. The wavelength-dependent filter and the ends of the first and second optical fibers are arranged with respect to each other so that light from the first optical fiber and reflected by the wavelength-dependent filter passes into the second optical fiber. Light which passes through the wavelength-dependent filter remains collimated by the collimated lens. Reflecting elements or a second collimating lens in focus with the end(s) of one or more optical fibers can placed next to the wavelength-dependent filter and on the other side of the collimating lens to create variations of the WDM coupler for many applications.

11 Claims, 3 Drawing Sheets

INTEGRATED WDM COUPLER DEVICES FOR FIBEROPTIC NETWORKS

BACKGROUND OF THE INVENTION

The present invention relates to fiberoptic networks and, more particularly, to fiberoptic couplers for WDM networks.

In WDM (Wavelength Division Multiplexed) fiberoptic networks, the wavelength of an optical signal is used to direct the signal through the network to its intended destination. The optical signals of a particular wavelength form a communication channel over a network. Ideally, couplers for such networks should have high performance, i.e., low insertion losses, and high isolation between channels. Additionally, the couplers should be manufactured at low cost, and easy to install in a network.

In a related patent application, U.S. application Ser. No. 08/470,815, now abandonment may 27, 1997 entitled "INTEGRABLE FIBEROPTIC COUPLER AND RESULTING DEVICES AND SYSTEMS," filed Jun. 6, 1995 and assigned to the present assignee, a basic fiberoptic coupler was disclosed. The present invention expands upon the basic coupler to provide for novel couplers which are very suitable for WDM fiberoptic networks. High performance is achieved with ease of manufacturing and installation.

SUMMARY OF THE INVENTION

The present invention provides for a wavelength division multiplexed coupler for coupling at least three optical fibers. The coupler has the ends of first, second and third optical fibers near a first face of a collimating lens. A wavelength-dependent filter, such as a long-pass filter, a short-pass filter or a band-pass filter, is located near a second face of the collimating lens. The wavelength-dependent filter and the ends of the first and second optical fibers are arranged with respect to each other so that light from the first optical fiber and reflected by the wavelength-dependent filter passes into the second optical fiber. Light which passes through the wavelength-dependent filter remains collimated by the collimated lens. Reflecting elements or a second collimating lens in focus with the end(s) of one or more optical fibers can placed next to the wavelength-dependent filter and on the other side of the collimating lens to create WDM couplers with many applications.

DETAILED DESCRIPTION OF PREFERRED EMBODIMENT(S)

Figure 1A:
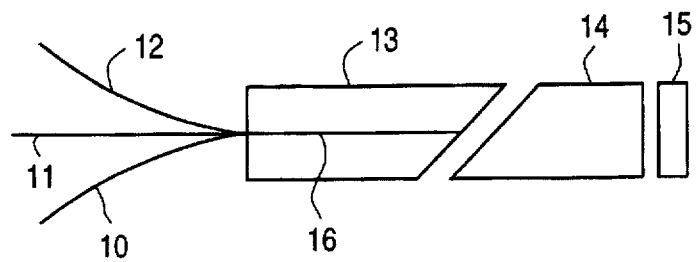
FIG. 1A is a diagram of a general WDM coupler with a wavelength-dependent filter according to the present invention.
Figure 1B:
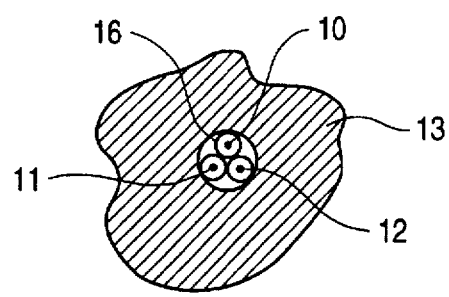
FIG. 1B is a detailed and enlarged end view of the sleeve in the WDM coupler of FIG. 1A.

FIG. 1 illustrates the general organization of a WDM coupler according to the present invention. The WDM coupler has the ends of at least three optical fibers 10–12, a sleeve 13, a collimating GRIN lens 14 and a wavelength-dependent filter 15. The ends of the optical fibers 10–12 are unjacketed so that only the core and cladding of the fibers are inserted into a central aperture 16 which runs longitudinally through the sleeve 13, which is formed from glass. The core and cladding of the fibers 10–12 may or may not be tapered, but, in any case, are inserted into the aperture 16 without being fused together. The size of the central aperture is such that the three optical fibers 10–12 fit snugly in the aperture. An enlarged end view of the fibers 10–12 in the aperture 16 is shown in FIG. 1B.

The face of the sleeve 13 (and the ends of the fibers 10–12) toward the collimating GRIN lens 14 is polished at an angle from 8°–12° from a plane perpendicular to the longitudinal axis of the sleeve 13. The face of the lens 14 toward the sleeve 13 is also angle-polished, but at a reciprocal angle, as shown in FIG. 1A. Stated in broad terms, the lens 14 collimates light from the fibers 10–12 (which appears as point sources) toward the filter 15. Similarly, the lens 14 refocusses collimated light from the direction of the filter 15 toward the optical fibers 10–12 into points. While a conventional lens could be used in place of the collimating GRIN lens 14, a quarter-pitch GRIN (GRaded INdex) lens has been found to be superior in terms of ease of assembly and reliability in the completed coupler.

The filter 15 is wavelength-dependent, i.e., light signals through the filter 15 are blocked or passed dependent upon the wavelength of the light signals. In the various embodiments of the present invention described below, bandpass filters, long-pass filters, and short-pass filters are used. As the name implies, a bandpass filter blocks light at all wavelengths, except for light in a certain range or band. A long-pass filter blocks light below a certain cut-off wavelength and passes (or transmits) light above that wavelength. A short-pass filter blocks light above a certain cut-off wavelength and passes (or transmits) light below that wavelength. In some of the embodiments below, the term, long/short pass filter, is used to identify a long pass filter or a short pass filter.

Light which is blocked by the filter 15 is reflected back through the lens 14. The light from the optical fibers 10–12 is collimated after a pass through the lens 14 toward the filter 15 and is refocussed after a second pass through the lens 14 toward the optical fibers 10–12. Thus the filter 15 can be adjusted so that the light from the core of one optical fiber 10–12 is refocussed into the core of another optical fiber. Light which is passed by the filter 15 remains collimated. This basic arrangement allows for varied WDM couplers suitable for a wide range of applications, as described below.

More details on the basic WDM coupler and its operation are described in U.S. application. Ser. No. 08/470,815, now abandonment described previously.

Figure 2A:
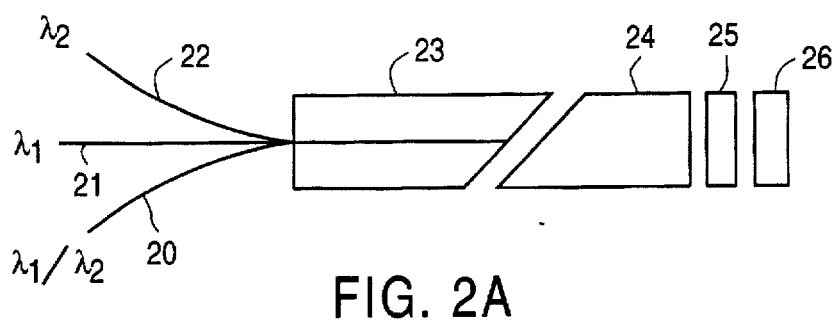
FIG. 2A is a diagram of the WDM coupler with a long-pass filter and a reflecting element according to one embodiment of the present invention.

FIG. 2A illustrates a particular embodiment of a WDM coupler according to the present invention. The WDM coupler couples three optical fibers and separates light signals of two wavelengths, $\lambda_1$ and $\lambda_2$, say, on a first optical fiber so that each of the other two optical fibers carries light signals of one of the wavelengths, $\lambda_1$ or $\lambda_2$.

The WDM coupler has three optical fibers 20–22 having end sections inserted into a glass sleeve 23, a quarter-pitch GRIN lens 24 and a long/short pass filter which, in the following description, is a long-pass filter 25. The coupler thus far described is similar to the coupler of FIGS. 1A and 2A. Additionally, the coupler has a reflecting element next to the filter 25 opposite the GRIN lens 24.

Figure 2B:
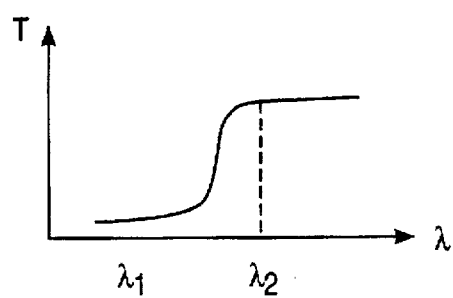
FIG. 2B is a graph of transmittance versus wavelength for the long-pass filter in the WDM coupler of FIG. 2A.

Input light signals of different wavelengths $\lambda_1$ and $\lambda_2$ from the optical fiber 20 are collimated by the GRIN lens 24. The collimated light then strikes the long-pass filter 25 which has a cutoff wavelength between $\lambda_1$ and $\lambda_2$. The operation of the long-pass filter 25 is illustrated in FIG. 2B, which contains a graph of the transmittance versus the wavelength of light signals incident upon the long-pass filter 25. As shown in FIG. 2B, light signals of $\lambda_1$, a wavelength shorter than the cutoff wavelength, has a low (ideally, zero) transmittance through the long-pass filter 25. The light signals at $\lambda_2$ have a high transmittance (ideally, one or unity) and are transmitted through the long-pass filter 25. In accordance with the present invention, the long-pass filter 25, which may be a dichroic mirror filter, is arranged so that light signals from the optical fiber 20 which are reflected back by the long-pass filter 25 are refocused by the GRIN lens 24 upon the core end of the optical fiber 21. Thus light from the optical fiber 20 which is reflected by the long-pass filter 25 enters the optical fiber 21. (Note that, by reciprocity, light from the optical fiber 21 which is reflected by the long-pass filter 25 passes into the first optical fiber 20.)

Behind the long-pass filter 25 is a reflecting element 26, which reflects all light. The reflecting element 26, typically formed with a gold coating on a flat glass surface, is arranged such that light passing through the long-pass filter 25 is reflected back through the filter 25 and refocused by the GRIN lens 24 at the core end of the third optical fiber 22. A multi-layer, dielectric coating may also be used in place of gold. Thus, depending upon the wavelength of the signals through the first optical fiber 20, the light signals are sent into either the second optical fiber 21 or the third optical fiber 22.

The manufacturing steps are relatively simple and straightforward. The filter 25 is first arranged so that light which is reflected by the filter 25 passes from the fiber 20 back to the fiber 21. Then, without rearranging the filter 25, the reflecting element 26 is arranged so that light which is reflected by the element 26 passes from the fiber 20 back to the fiber 22.

The independence in the filter and reflecting element arranging steps permits the described WDM coupler to be modified with additional optical fibers and long-pass filters. For example, a fourth optical fiber may be inserted into the glass sleeve 23 and a second long-pass filter may be inserted between the long-pass filter 25 and the reflecting element 26. The additional filter is arranged so that light from the optical fiber 20 is reflected back by the added filter into the added optical fiber.

The inserted long-pass filter has a cutoff wavelength greater than that of the long-pass filter 25. Thus the optical fiber 20 can carry input light signals of increasing wavelengths $\lambda_1$, $\lambda_2$ and $\lambda_3$. The long-pass filter has a cut-off wavelength between $\lambda_1$ and $\lambda_2$, and the second long-pass filter has cut-off wavelength between $\lambda_2$ and $\lambda_3$. Light signals at wavelength $\lambda_1$ are reflected by the long-pass filter 25 into the optical fiber 21, light signals at wavelength $\lambda_2$ are reflected by the second long-pass filter into the inserted fourth optical fiber, and light signals at wavelength $\lambda_3$ are reflected by the reflecting element 26 into the optical fiber 22. In this manner, more optical fibers and long-pass filters can be added.

While the WDM coupler above has been described in terms of long-pass filters, it should be evident that short-pass filters, which may also be dichroic mirror filters, can also be used. For instance, a short-pass filter can be used for the long-pass filter 25, and for the second long-pass filter described in the immediately preceding paragraphs.

Figure 3A:
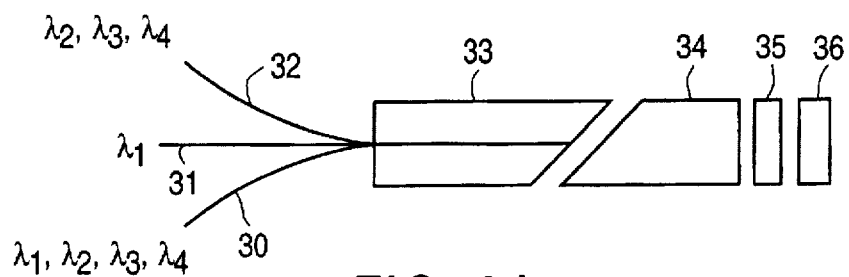
FIG. 3A is a diagram of the WDM coupler with a bandpass filter and a reflecting element according to an embodiment of the present invention.
Figure 3B:
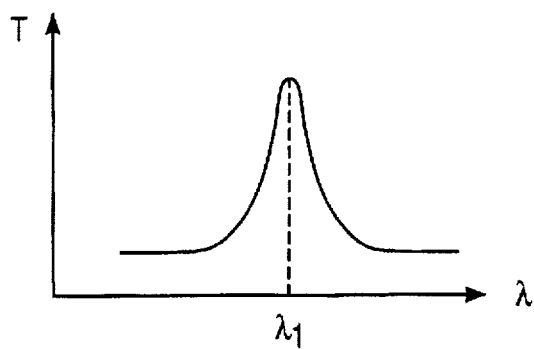
FIG. 3B is a graph of transmittance versus wavelength for the bandpass filter in the WDM coupler of FIG. 3A.

The WDM coupler of FIG. 3A is similar to the coupler of FIG. 2A. The end sections of three optical fibers 30–32 are inserted into a glass sleeve 33. The end of the glass sleeve 33 and the fibers 30–32 face a collimating GRIN lens 34. At the other face of the GRIN lens is a bandpass filter 35 and a reflecting element 36. As illustrated in FIG. 3B, the bandpass filter transmits light in a narrow range, here shown as around wavelength $\lambda_1$, and blocks light at other wavelengths.

As shown in FIG. 3A, light signals at various wavelengths, $\lambda_1$, $\lambda_2$, $\lambda_3$ and $\lambda_4$, are sent as input signals over the first optical fiber 30 into the WDM coupler. The signals on the optical fiber 30 are collimated by the GRIN lens 34 and passed to the bandpass filter 35. The bandpass filter 35 reflects the light signals at wavelengths $\lambda_2$, $\lambda_3$ and $\lambda_4$ back into the GRIN lens 34 which refocuses the reflected signals at the end of the second optical fiber 32. The light signals at $\lambda_1$, which are passed by the bandpass filter 35, are reflected by the reflecting element 36 back through the bandpass filter 35 to the GRIN lens 34. The GRIN lens 34 refocuses the light signals reflected by the reflecting element 36 at the end of the third optical fiber 31. Thus, the WDM coupler of FIG. 3A can be used as an effective add/drop filter in a WDM fiber optic network. Incoming light signals at a wavelength selected by the bandpass filter 35 are removed from the first optical fiber 30 to the fiber 31; the light signals at other wavelengths are passed to the second optical fiber 32. Conversely, light signals at the selected wavelength can added through the optical fiber 31 to the first optical fiber 30.

The WDM couplers illustrated in FIGS. 2A, 2B and 3A, 3B have the advantages not only of performance, but also of very small size. The couplers include only the end sections of optical fibers, a sleeve for the optical fibers, a GRIN lens, a wavelength-dependent filter and a reflecting element. The limited number of components permits a very compact WDM coupler. For example, the WDM coupler of FIGS. 2A and 2B can be manufactured in a 3.2×16 mm package. Isolation between the two channels is high, approximately 50 dB.

The addition of a second collimating lens and a sleeve with optical fiber(s) to the basic WDM design creates different WDM couplers with increased functionality. The WDM coupler illustrated in FIG. 4A can handle optical signals at three different wavelengths. A first optical fiber 40 receives input optical signals at wavelengths $\lambda_1$, $\lambda_2$ and $\lambda_3$. The coupler can separate these signals so that the optical signals at $\lambda_1$ pass to the optical fiber 41, the optical signals of wavelength $\lambda_2$ pass to the optical fiber 42, and the optical signals at $\lambda_3$ pass to the optical fiber 48.

Figure 4A:
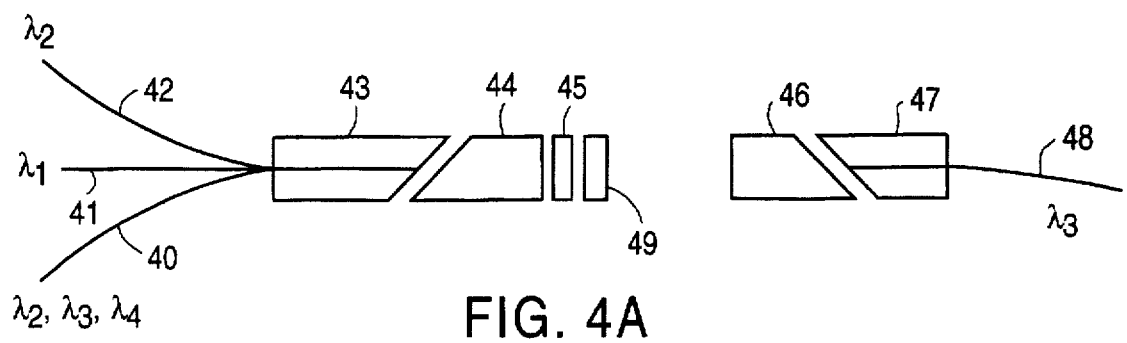
FIG. 4A is a diagram of a WDM coupler with two long-pass filters according to another embodiment of the present invention.

As in previously described WDM couplers, the coupler in FIG. 4A has a glass sleeve 43 which receives end sections of the optical fibers 40–42. A collimating GRIN lens 44 is in front of the slant angled face of the sleeve 43. In front of the GRIN lens 44 are two wavelength dependent filters, in this case, long-pass filters 45 and 49. In the optical path of light which is passed through the two filters 45 and 49, is a second collimating GRIN lens 46. Next to the GRIN lens 46 and opposite the long-pass filters 45 and 49 is a second glass sleeve 47 in which the end section of the optical fiber 48 has been inserted. As in the case of the sleeve 43 and GRIN lens 44, the sleeve 47 (and the end of the optical fiber 48) is polished at an angle and faces a reciprocally angled surface of the GRIN lens 46.

The long-pass filter 45 has a cutoff wavelength which is shorter than that of the long-pass filter 49. The graph of FIG. 4B of transmittance versus wavelength illustrates the operation of both filters 45 and 49. The solid line illustrates the operation of the filter 45 which has a cutoff wavelength between $\lambda_1$ and $\lambda_2$. The operation of filter 49 is illustrated by the dashed-dot line. The filter 49 has a cutoff frequency between $\lambda_2$ and $\lambda_3$. Thus, the long-pass filter 45 reflects signals at wavelength $\lambda_1$ and passes optical signals at wavelength $\lambda_2$ and $\lambda_3$. The filter 45 is adjusted such that light signals from the optical fiber 40 and reflected back by the filter 45 are refocused by the collimating lens 44 at the end of optical fiber 41. The long-pass filter 49 is adjusted so that light signals from the optical fiber 40 and reflected back by the filter 49 are refocussed by the GRIN lens 44 at the end of the optical fiber 42. Thus, signals at wavelength $\lambda_2$ pass from the optical fiber 40 to the optical fiber 42. Signals which are transmitted by both filters 45 and 49 are refocused by the collimating GRIN lens 46 at the end of the optical fiber 48. In other words, optical signals at wavelength $\lambda_3$ pass from the optical fiber 40 to the optical fiber 48.

Figure 4B:
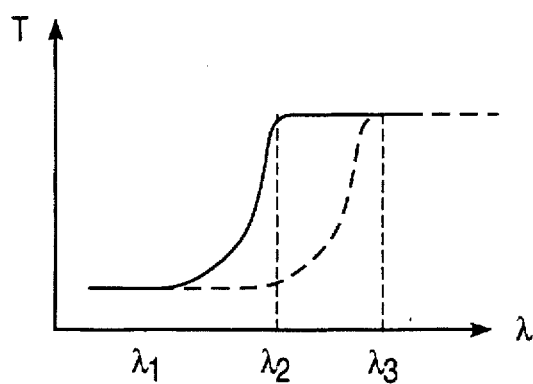
FIG. 4B is a graph of transmittance versus wavelength for the bandpass filters in the WDM coupler of FIG. 4A.

Furthermore, as explained previously with respect to the FIG. 2A WDM coupler, additional long-pass filters and optical fibers may be inserted into the WDM coupler of FIGS. 4A and 4B. For example, an end section of a fifth optical fiber may be inserted into the sleeve 43 and a third long-pass filter placed next to the long-pass filter 49 opposite the filter 45. The third long-pass filter is adjusted to reflect light signals from the optical fiber 40 into the end of fifth optical fiber. With the cut-off frequency of the third long-pass filter selected appropriately, the modified WDM coupler can separate optical signals at four different wavelengths. Of course, short-pass filters may also be used instead of the long-pass filters.

Figure 5:
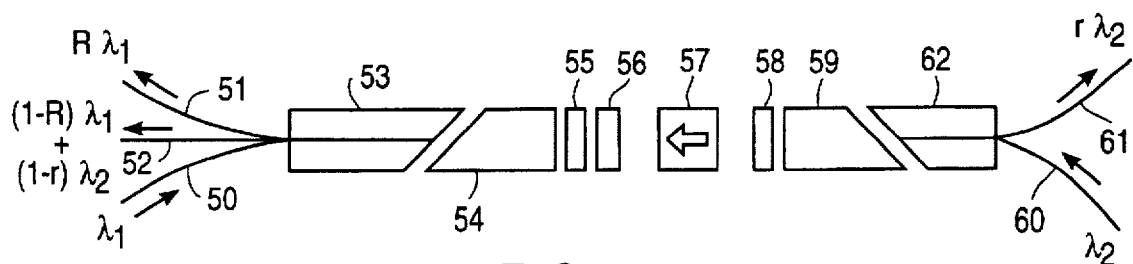
FIG. 5 is a diagram of a WDM coupler with partial reflecting elements, an isolator core and a long-pass filter according to another embodiment of the present invention.

As stated previously, the present invention provides for WDM couplers with many different applications. FIG. 5 is a diagram of a WDM coupler which has particular utility as an integrated fiber amplifier module. The coupler may be used with a rare-earth doped fiber, such as an erbium-doped fiber, and a pumping laser.

The WDM coupler has end sections of three optical fibers 50–52 inserted into the central aperture of a glass sleeve 53. A slant-angled face of the glass sleeve 53 faces a reciprocally angled face of a collimating GRIN lens 54, as described previously. The opposite face of the GRIN lens 54 is near a partial reflecting element 55 and a long-pass filter 56. Next to the long-pass filter 56 is an optical isolator core subassembly 57, and a second partial reflecting element 58. A second collimating GRIN lens 59 and a glass sleeve 62 which has end sections of optical fibers 60 and 61 inserted into its central aperture completes the WDM coupler.

The glass sleeves 53 and 62, the collimating lenses 54 and 59, and the long-pass filter 56 are similar elements of previously described WDM couplers. The partial reflecting elements 55 and 58 are new and are designed to reflect only a predetermined small amount of light, i.e., most light is transmitted through the reflecting element. The partial reflecting elements 55 and 58 are each formed typically by a very thin layer of gold, or a multi-layer dielectric coating, on a flat glass surface. The amount of gold or dielectric coating is such that only a very small amount of light is reflected.

The optical isolator core subassembly 57 is formed by two wedge-shaped birefringent crystals on either side of a Faraday rotator and is described in the above-mentioned patent application, U.S. application Ser. No. 08/470,815 now abandonment. The optical isolator core subassembly 57 is arranged so that only light signals from the optical fibers 60 and 61 are transmitted toward the optical fibers 50–52, as indicated by the arrow in the optical isolator 57 symbol in FIG. 5. Light signals in the opposite direction are blocked.

The first partial reflecting element 55 is adjusted so that light signals on the optical fiber 50 are reflected back partially toward the optical fiber 51. The small fraction of light reflected by the element 55 is indicated by the letter R in FIG. 5. Light signals which is not reflected by the partial reflecting element 55 are reflected by the long-pass filter 56. The filter 56 is adjusted such that optical signals from the fiber 50 below the cut-off wavelength of the filter 56 are reflected and refocussed by the GRIN lens 54 at the end of the optical fiber 52. Thus, light signals of wavelength $\lambda_1$, say, below the cut-off wavelength of the filter 56 are reflected from the optical fiber 50 back into the fibers 51 and 52. The optical fiber 51 receives a small fraction R while the optical fiber 52 receives most of the light, 1-R, from the fiber 50.

Light signals at a longer wavelength $\lambda_2$ are sent into the coupler through the optical fiber 60. The second partial reflecting element 58 is adjusted so that a small fraction r of the light from the fiber 60 is reflected and refocussed by the GRIN lens 59 at the end of the optical fiber 61. Most of the light from the fiber 60 is transmitted by the optical isolator core 57 through the long-pass filter 56 and first partial reflecting element 55. These elements are aligned with the first collimating GRIN lens 54 and the end of the fiber 52 such that the light signals transmitted through the partial reflecting element 58 and the optical isolator core 57 are received by the fiber 52.

This arrangement makes a very compact WDM coupler for a rare-earth doped fiber amplifier. The optical fiber 60 is connected to a message source so that the coupler receives message signals through the fiber 60. In many WDM networks, the message signals are typically sent at wavelengths at 1,550 nm. The message signal can be monitored through the optical fiber 61 which receives a small fraction, r, of the strength of the light signals on the fiber 60. In other words, the optical fiber 61 is a tap on the signals on the fiber 60. Most of the strength of the message signals, 1-r, passes through the partial reflecting element 58 to the optical fiber 52.

The optical fiber 50 is connected to a pumping laser having an output wavelength below the cutoff wavelength of the long-pass filter 56. In many of the WDM networks, the pumping lasers typically have an output wavelength around 980 nm. The optical fiber 52 is connected to the rare-earth doped optical fiber. The rare-earth doped fiber receives the message signal from the fiber 60 and the light from the pumping laser to amplify the message signal. In FIG. 5, this is symbolized by $(1-R)\lambda_1+(1-r)\lambda_2$. The optical fiber 51 provides a tap to monitor the output of the pumping laser from the optical fiber 50.

Figure 6A:
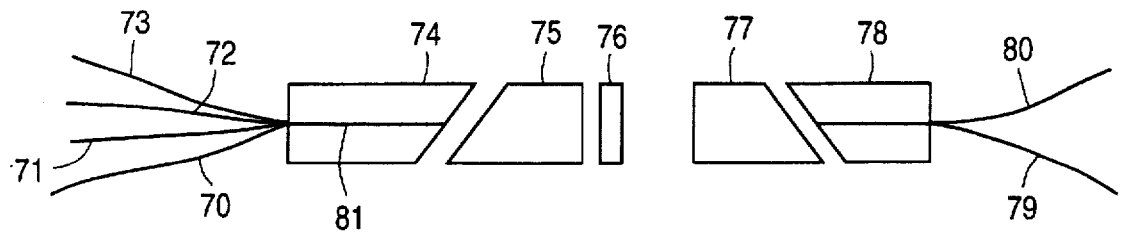
FIG. 6A is a diagram of a WDM coupler with multiple optical fibers according to still another embodiment of the present invention.
Figure 6B:
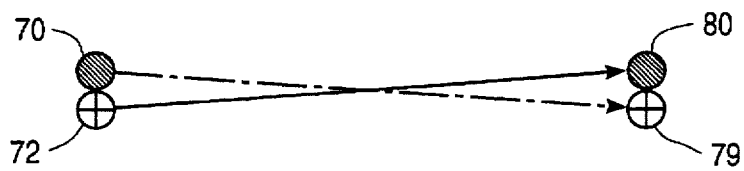
FIG. 6B is a detailed end view of the alternate sleeve which may be used in the WDM coupler of FIG. 6A.
Figure 6C:
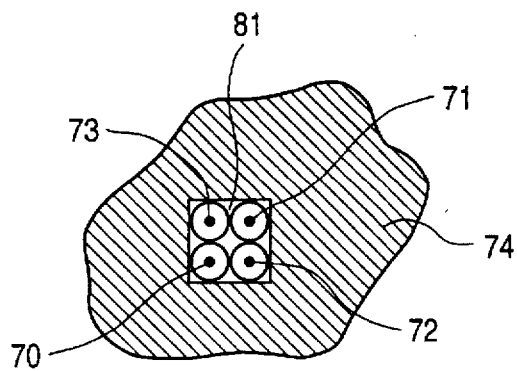
FIG. 6c is a glass sleeve having square apertures.

The present invention also provides for WDM coupler with more than one optical fiber receiving input signals. The WDM coupler of FIG. 6A has the end sections of four optical fibers 70–73 which are inserted into the central aperture of the sleeve 74. A collimating GRIN lens 75 is placed between the sleeve 74 and a wavelength dependent filter 76. Opposite the GRIN lens 75 is a second collimating GRIN lens 77 and a sleeve 78 having a central aperture into which the end section of optical fiber 79 and 80 are inserted. The filter 76 may be either a long-pass filter, short-pass filter or a bandpass filter. In any case, the ends of the optical fibers 70–73 are arranged with respect to the collimating GRIN lens 75 and the filter 76 such that light from optical fiber 70 is reflected back and refocused by the GRIN lens 75 at the end of the fiber 71. Similarly, light from optical fiber 72 is reflected back by the filter 76 and refocused by the GRIN lens 75 at the end of the optical fiber 73. It should be noted that the optical fibers 70–71 are placed in the central aperture 81 in the glass sleeve 74 such that the fibers 70 and 71, 72 and 73 are located opposite each other in the aperture 81. The aperture 81 can be circular. Furthermore, glass sleeves having square apertures as shown in FIG. 6C are also effective in ensuring a snug fit of the end sections of the fibers 70–73. Glass sleeves with such central apertures with square cross-sections may be obtained from Vitro Dynamics, Inc. of Rockaway, New Jersey.

Light which is transmitted through the filter 76 is refocused by the second GRIN lens 77. The GRIN lens 77 and the ends of the fibers 79 and 80 are arranged with respect to the filter 76, the first collimating GRIN lens 75 and the ends of the optical fibers 70–73 such that light from the optical fibers 70 is refocused by the second collimating GRIN lens at the end of the optical fiber 79 and light from the optical fiber 72 is refocused by the second collimating GRIN lens 77 at the end of the optical fiber 80. The paths of light from the optical fibers 70 and 72 to the optical fibers 79 and 80 are illustrated in FIG. 6B. A more complete description of the theoretical operation of WDM couplers having multiple input optical fibers and multiple output optical fibers with collimating lenses is found in the assignee's patent application referenced above.

While the above is a complete description of the preferred embodiments of the present invention, various alternatives, modifications and equivalents may be used. It should be evident that the present invention is equally applicable by making appropriate modifications to the embodiment described above. For example, different combinations of long/short pass filters and band-pass filters may adapted into the WDM couplers described above. Therefore, the above description should not be taken as limiting the scope of invention which is defined by the metes and bounds of the appended claims.

What is claimed is:

1. A wavelength division multiplexed coupler for coupling at least four optical fibers, said coupler comprising an end of a first optical fiber;

an end of a second optical fiber;

an end of a third optical fiber;

an end of a fourth optical fiber;

a first collimating lens having first and second end faces, said first end face of said first collimating lens and said ends of said first, second and third optical fibers proximate each other and said first end face;

a first long/short pass filter proximate said second end face of said first collimating lens, said first long/short pass filter, said ends of said first and second optical fibers arranged with respect to each other so that light from said first optical fiber and reflected by said first long/short pass filter passes into said second optical fiber;

a second long/short pass filter proximate said first long/short pass filter and opposite said second end face of said first collimating lens, said ends of said first and third optical fibers, said first collimating lens, said first long/short pass filter and said second long/short pass filter arranged with respect to each other so that light from said first optical fiber, passed by said first long/short pass filter, and reflected by said second long/short pass filter passes into said third optical fiber; and a second collimating lens, said end of said fourth optical fiber in close proximity with a first end face of said second collimating lens so that said second collimating lens refocuses said light from said second long/short pass filter into said end of said fourth optical fiber whereby light not reflected by said first and second long/short pass filters passes into said end of said fourth optical fiber.

2. The wavelength division multiplexed coupler of claim 1 wherein said first and second collimating lenses each comprises a quarter-pitch GRIN lens.

3. The wavelength division multiplexed coupler of claim 2 wherein said first and second long/short pass filters each have a cutoff wavelength, said cutoff wavelength of said first long/short pass filter being shorter than said cutoff wavelength of said second long/short pass filter.

4. The wavelength division multiplexed coupler of claim 3 further comprising an end of a fifth optical fiber, said ends of said first, second, third and fifth optical fibers proximate each other and said first end face of said first collimating lens;

a third long/short pass filter proximate said second long/short pass filter and opposite said first long/short pass filter, said ends of said first and fifth optical fibers arranged with respect to each other, said first long/short pass filter, said second long/short pass filter and said third long/short pass filter so that light from said first fiber, passed by said first and second long/short pass filters, and reflected by said third long/short pass filter passes into said fifth optical fiber.

5. The wavelength division multiplexed coupler of claim 4 wherein said first, second and third long/short pass filters each have a cutoff wavelength, said cutoff wavelength of said first long/short pass filter being shorter than said cutoff wavelength of said second long/short pass filter, and said cutoff wavelength of said second long/short pass filter shorter than said cutoff wavelength of said third long/short pass filter.

6. A wavelength division coupler for coupling five optical fibers, said coupler comprising an end of a first optical fiber;

an end of a second optical fiber;

an end of a third optical fiber;

an end of a fourth optical fiber;

an end of a fifth optical fiber;

a collimating GRIN lens having first and second end faces, said first end face of said GRIN lens and said ends of said first, second and third optical fibers proximate each other and said first end face;

a first partial reflecting element proximate said second end of said first collimating lens, said ends of said first and second optical fibers, said first partial reflecting element arranged with respect to each other so that light from said first fiber and reflected by said first partial reflecting element passes into said third optical fiber;

a long/short pass filter proximate said second end face of said GRIN lens, said ends of said first and third optical fibers, said first partial reflecting element and said first long/short pass filter arranged with respect to each other so that light from said first fiber and reflected by said first long/short pass filter passes into said third optical fiber;

an optical isolator core proximate said long/short pass filter and opposite said first partial reflecting element, said isolator core arranged to block light from said first fiber and to pass light toward said first fiber;

a second partial reflecting element proximate said optical isolator core opposite said long/short pass filter; and a second collimating lens, said ends of said fourth and fifth optical fibers in close proximity with a first end face of said second collimating lens, said ends of said fourth and fifth optical fibers, said second collimating lens, said second partial reflecting element, said optical isolator core, said first long/short pass filter, said first collimating lens and said ends of said first, second and third optical fibers arranged so that said light from said fourth optical fiber and reflected by said second partial reflecting means passes into said fifth optical fiber, and light from said fourth optical fiber and passed by said second partial reflecting element, said optical isolator core, said long/short pass filter and said first partial reflecting element, passes into one of said first, second or third optical fibers.

7. The wavelength division coupler of claim 6 wherein said ends of said fourth and fifth optical fibers, said second collimating lens, said second partial reflecting element, said optical isolator core, said first long/short pass filter, said first collimating lens and said ends of said first, second and third optical fibers arranged so that light from said fourth optical fiber and passed by said second partial reflecting element, said optical isolator core, said long/short pass filter and said first partial reflecting element, passes into said third optical fiber.

8. The wavelength division coupler of claim 6 wherein long/short pass filter comprises a dichroic mirror filter.

9. A wavelength division multiplexed coupler for coupling at least six optical fibers, said coupler comprising an end of a first optical fiber;

an end of a second optical fiber;

an end of a third optical fiber;

an end of a fourth optical fiber;

an end of a fifth optical fiber;

an end of a sixth optical fiber;

a first collimating lens having first and second end faces, said first end face of said collimating lens and said ends of said first, second, third, and fourth optical fibers in close proximity with each other and said first end face;

a wavelength-dependent filter proximate said second end face of said first collimating lens, said wavelength-dependent filter reflecting or passing light responsive to wavelength of light incident thereupon, said wavelength-dependent filter, said ends of said first, second, third and fourth optical fibers arranged with respect to each other so that light from said first optical fiber and reflected by said wavelength-dependent filter passes into said second optical fiber and so that light from said third optical fiber and reflected by said wavelength-dependent filter passes into said fourth optical fiber; and a second collimating lens in the path of said collimated light from said wavelength-dependent filter, said ends of said fifth and sixth optical fibers in close proximity with a first end face of said second collimating lens and arranged so that light from said first optical fiber passed by said wavelength-dependent filter passes into said fifth optical fiber and light from said third optical fiber and passed by said wavelength-dependent filter passes into said sixth optical filter.

10. The wavelength division multiplexed coupler of claim 9 wherein said wavelength-dependent filter comprises a long/short pass filter.

11. The wavelength division multiplexed coupler of claim 9 wherein said wavelength-dependent filter comprises a band-pass filter.

* * * * *